United States Patent Office 2,934,451
Patented Apr. 26, 1960

2,934,451

ANTI-VESICANT COATING COMPOSITION

William W. Prichard, Claymont, Del., assignor to the United States of America as represented by the Secretary of War No Drawing. Application March 14, 1945
Serial No. 582,791

3 Claims. (Cl. 106—287)

The invention described herein may be manufactured and used by or for the Government, for governmental purposes, without the payment to me of any royalty thereon.

This invention relates to new compositions of matter and more particularly to the treatment of fabrics and clothing for protection against the action of mustard gas and similar vesicants.

It is known that the compounds herein referred to as "tertiary N-chloroureas" are of value for protecting fabrics and other articles against the penetration of vapors of vesicants of the type represented by B,B'-dichlorodiethyl sulfide. However, these tertiary N-chloroureas have a tenderizing effect on fabrics, particularly of the cellulosic type, with the result that the fabric eventually becomes weak and unsuitable for use in clothing. The tertiary N-chloroureas also undergo decomposition with loss of chlorine, with the result that, after varying periods of time on the fabric, they lose their efficiency. The tertiary N-chlorourea-treated fabrics, are furthermore, weakened by exposure to mustard gas vapor, and, if the exposure is severe, they are unsuited for decontamination and reuse.

This invention has as an object the production of new and useful compositions of matter. A further object is a composition which gives to cellulosic materials, and particularly clothing, protection against penetration of vesicant vapors without the deterioration in the fabric that previously accompanied the treatment of cloth for this purpose, and without loss of the permeability to air which is essential in most types of clothing. A further object is the manufacture of new and useful products comprising cellulosic material treated with the new composition described herein. Further objects reside in methods for obtaining the above mentioned compositions and products. Other objects will appear hereinafter.

The above objects are accomplished in accordance with the present invention through the preparation of compositions comprising a tertiary N-chlorourea and a salt of an alkaline earth metal (i.e., calcium, strontium, or barium) with an acid having a dissociation constant less than about $1.5 \times 10^{-2}$, said compound being substantially non-reactive with the tertiary N-chlorourea under formulation conditions.

I have found that the inclusion of a small amount of a salt of the kind just mentioned (referred to herein as the stabilizer) in the coating or impregnating composition containing the tertiary N-chlorourea will overcome or greatly lessen the difficulties previously pointed out. Particularly advantageous for the present purpose are tertiary N-chlorourea compositions containing calcium carbonate as the stabilizer. When compositions of the kind described herein are applied to cellulosic materials, such as fabrics, the action of the tertiary N-chlorourea, its decomposition products, and its reaction products with vesicants on the cellulose is considerably reduced and in many instances practically eliminated, the fabric retaining substantially its original strength for long periods while still permitting passage of air therethrough. Also, in most instances, the loss of active chlorine from the tertiary N-chlorourea in contact with the cellulose is retarded, thus prolonging in still another way the period during which the treated material will serve its intended purpose.

The action of the stabilizers of this invention, when used with the tertiary N-chlorourea on cellulosic materials, such as fabrics, is maintained longest (i.e., there is less tendering of the fabric and loss of active chlorine) if the treated fabric is stored or otherwise kept at a relative humidity of less than 50%, preferably less than 10%, especially when the fabric is or may be subjected to high temperatures.

By the expression "tertiary N-chlorourea" is meant a compound containing the urea nucleus (i.e., a carbonyl group attached to two trivalent nitrogen atoms), at least one and preferably both of these nitrogen atoms being attached to chlorine atoms, the other valence of the nitrogen atoms being satisfied by carbon atoms.

The manner of compounding the tertiary N-chlorourea stabilizer composition, and the auxiliary ingredients to be included, will depend upon the purpose for which the composition is intended and the conditions under which it is to be used.

In instances where washfastness of the impregnated material is of paramount importance, it is preferable to use dispersions of the stabilizer and the tertiary N-chlorourea in suitable organic solvents. Such dispersion can be made in one way as follows: In order to obtain a concentrated slurry, the stabilizer is first dispersed in a small amount of the solvent in a device such as a colloid mill and in the presence of a suitable dispersing agent; the tertiary N-chlorourea and the binder are separately dissolved in the principal and remaining amount of the solvent; and the slurry of the stabilizer is then added to this solution with suitable agitation. Upon application of the resulting dispersion to a cellulosic fabric, a marked protective effect on the strength of the fabric is obtained, as well as a stabilizing action on the tertiary N-chlorourea. The finish is also resistant to repeated launderings. Example II is illustrative of dispersions in organic solvents. Examples of other suitable organic solvents are: dioxane, ethylene dichloride, and chloroform.

In instances where transportation and storage problems are important, and where the composition is to be used within a short period of time, a satisfactory procedure is to formulate the composition as a slef-emulsifiable paste which can be readily dispersed in water at the time and place of use. Such pastes are normally prepared by mixing mechanically, in an apparatus designed to handle masses of doughy consistency, the tertiary N-chlorourea in finely divided (about 1–5 microns) form, the stabilizer, a binder, and a dispersing agent which is non-reactive to the tertiary N-chlorourea and preferably liquid at room temperature. This mixture is masticated until it attains a putty-like consistency, after which it is placed in sealed containers until ready for use.

It is possible to combine the stabilizer and tertiary N-chlorourea in the form of a dry powder, usually to be dispersed in water at the time of use, the binder being added to the dispersion at that time if one is required for the particular use intended. Such dry mixtures may be stored for long periods of time in cellulosic (e.g. paper) containers without injury to the container and they show remarkable stability even under hot and humid conditions.

In instances where the composition is to be used within a few weeks without further mixing operations, and in which only a moderate degree of washfastness in the treated material is necessary, it is most practical to prepare the tertiary N-chlorourea stabilizer composition in the form of an aqueous dispersion. This is also desirable where there are health or fire hazards at the time and place of use, or when economy and availability of the dispersing medium must be considered. One good method of preparing such aqueous dispersion is as follows: The tertiary N-chlorourea, stabilizer and dispersing agent are ground in a ball mill in the presence of water until a particle size of about 1 to 5 microns is obtained; the binder is emulsified separately in any suitable turbulent flow device such as a colloid mill or a centrifugal pump; the slurry from the ball mill grind is blended with the emulsion of the binder by stirring the two together; and the dispersion is then diluted to the desired strength. Another good method for making them is to prepare a mixture of the stabilizer and finely divided tertiary N-chlorourea, add this mixture to the emulsion of the binder, and pass the resulting composition through a turbulent flow device.

The particular methods for application and use of the stabilized tertiary N-chlorourea compositions of the present invention will depend upon the form of the composition and the character of the material or object to which it is to be applied. Thus the powders and pastes previously referred to, although they can be applied as such, will normally first be dispersed in a suitable liquid medium. If the object or surface to be treated is stationary, the liquid composition may be applied in any conventional manner, as by spraying or brushing or with an absorbent material such as a sponge. If, as is more frequently the case, the material to be impregnated is a movable or flexible article, e.g., paper or fabric, it is simply passed through or immersed in the liquid impregnating composition and then pressed or wrung out until the desired amount of impregnating medium remains. If toxic solvents are present, these operations should of course be conducted under conditions adapted to the removal of the solvent with a minimum of contact with the operator. The treated material is then allowed to dry more completely by evaporation of solvent or water under suitable conditions. In the case of fabrics or clothing treated with either aqueous or organic solvent dispersions, it is satisfactory to employ equipment ordinarily used for dry cleaning purposes and consisting essentially of a perforated rotating cylinder with the necessary attached shell, centrifuge, and rotary tumbling drier.

The following examples, in which parts given are by weight, illustrate specific embodiments of the invention. The invention is not limited to these particular examples.

*Example I*

To a mixture of 100 parts of N,N'-bis-(2,4,6-trichlorophenyl)-N,N'-dichlorourea, 10 parts of calcium carbonate, 50 parts of a 10% aqueous solution of polyvinyl alcohol and 50 parts of water is added with stirring 75 parts of chlorinated paraffin wax. The smooth emulsion is then diluted with 500 parts of water. Cotton herringbone twill impregnated with this composition retains 66% of its original active chlorine and 75% of its original tensile strength after 84 days in simulated tropical storage.

*Example II*

An impregnating bath containing 3264 parts of tetrachloroethane, 320 parts of N,N' - bis - (2,4,6 - trichlorophenyl) - N,N' - dichlorourea, 240 parts of chlorinated paraffin wax and 32 parts of calcium carbonate is heated to 60° C. and used to impregnate herringbone twill. After exposure to water vapor for 96 hours at 70° C., the fabric has a tensile strength of 109 lbs./sq. in. as compared to 0 for a control containing no calcium carbonate. Calcium borate and calcium stearate have substantially the same effect as calcium carbonate.

*Example III*

Another composition which has shown good resistance on outdoor exposure and simulated tropical storage tests comprises 100 parts of 1,3,4,6-tetrachloro-3a,6a-dimethylglycoluril of the formula:

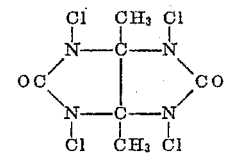

and 50 parts of calcium carbonate, 75 parts of chloroparaffin, 20 parts of "Tamol NNO" (a sulfonated naphthalene-formaldehyde condensation product) and 5 parts of polyvinyl alcohol. It is used in aqueous emulsion at a concentration of 4.1% of 1,3,4,6-tetrachloro-3a,6a-dimethylglycoluril. The calcium carbonate may be replaced by calcium phosphate or calcium phytate with similar results.

An "individual" clothing impregnating set, containing a tertiary N-chlorourea stabilized according to the present invention, can be prepared according to the following example. The quantities of materials and arrangement of the package are such that the individual soldier may employ a steel helmet in which to carry out the final mixing operations and the impregnation of his clothing.

*Example IV*

A thoroughly blended mixture of 75 grams of N,N'-di - (2,4,6 - trichlorophenyl) - N,N' - dichlorourea, of which about 93% is under 8 microns in particle size, and 7.5 grams of calcium carbonate, of which about 97% is under 8 microns in particle size, is placed in a terne plate metal can (base 3" x 1¾", height 3") which is fitted with a slip lid, the inner surface of the can being coated with a chlorinated rubber lacquer plasticized with tricresyl phosphate to render it chemically resistant to the action of the tertiary N-chlorourea. Two small tubes (⅞" in diameter and 2½" long), made of lead so they will also be chemically resistant to the tertiary N-chlorourea, are filled with ingredients as follows and embedded in the tertiary N-chlorourea/stabilizer mixture. In the first tube is placed 19.5 grams of chlorinated paraffin wax to serve as a binder, and the tube closed with a crimp seal. In the second tube are placed 7.5 grams of "Aresklene-400" (dibutyl phenylphenol sodium disulfonate) to serve as an emulsifying and dispersing agent, and 2.5 grams of a water-dispersible color containing 54% "Lithosol Blue-OL," 36% "Lithosol Yellow GP," and 10% "Lithosol Orange OTP," the tube then being hermetically sealed to preclude entrance of moisture which in combination with heat causes the "Aresklene-400" to set to a hard cake. Operating instructions are then attached to the outside of the can (which is painted with an olive drab paint), and the slip lid is sealed on with a special industrial sealing tape ("John Flex Tape"). Simulated tropical storage tests carried out on this "Helmet Set" at a temperature of 45° C. and a relative humidity of 80–85% show that the ingredients possess satisfactory chemical stability for at least three months. After this storage interval, there is relatively little corrosion inside the container, and the calcium carbonate-stabilized N,N'-di-(2,4,6-trichlorophenyl)-N,N'-dichlorourea retains approximately 96% of its active chlorine. A comparable storage test carried out in the absence of the calcium carbonate stabilizer shows that more extensive corrosion takes place inside the lacquered can and that the tertiary N-chlorourea retains about 90% of its active chlorine.

A portable field impregnating set, containing a tertiary N-chlorourea stabilized according to the present invention, may be made up as illustrated in the following example. This set weighs approximately fifty pounds and will take care of the clothing of 15 to 20 men.

Example V

Into a plywood box of approximate dimensions 9½" x 9½" x 28" are placed the following components:

(1) A 3¾ gallon, permeable "Fiberpak" carton 8" in diameter and 18" tall, containing a well-blended mixture of 16.5 lb. of N,N'-dichloro-N,N'-(2,4,6-trichlorophenyl) urea and 1.65 lb. of calcium carbonate, both micronized to particle sizes as given in Example IV.

(2) A small metal container (8" in diameter and 3" high) having an inner coating of phenol-formaldehyde resin "Amberol HH–1," and containing 4.3 lb. of chlorinated paraffin wax binder. This can is closed with a friction top lid.

(3) A second small metal container, of the same size and having the same inner coating as that under (2), into which is placed 1.65 lb. of "Aresklene–400" (dibutylphenyl-phenol sodium disulfonate) to serve as an emulsifying and dispersing agent. This can is also closed with a friction top lid to prevent entrance of moisture and the attendant setting of the "Aresklene–400" to a hard mass.

(4) A collapsible canvas bucket with stake tabs attached, a paddle, and a rope of clothesline size.

Simulated tropical storage tests carried out on this light weight simplified field set at a temperature of 45° C. and a relative humidity of 80–85% show the ingredients to possess satisfactory chemical stability for at least six months. Permeable "Fiberpak" drums of the type used in this field set containing an intimate blend of micronized N,N'-di-(2,4,6-trichlorophenyl)-N,N'-dichlorourea and calcium carbonate in the ratio 100/10 are in good condition after six months, the tertiary N-chlorourea retaining about 81% of its original active chlorine. In comparison, "Fiberpak" drums containing this unstabilized tertiary N-chlorourea become so weak after three months storage as to be practically useless.

The preferred methods of compounding and using the tertiary N-chlorourea stabilizer compositions of this invention are illustrated in the above examples. Still others which can be employed are as follows:

The aqueous dispersions, for example, can be made by mixing stabilizer, dispersing agent, binder, and preferably a small amount of water in a suitable mixing device, whereby a self-emulsifiable paste is formed, this paste then being emulsified in water and the finely divided tertiary N-chlorourea stirred into the resulting emulsion. A further method of fabric impregnation consists in applying the stabilizer to the fabric and then treating the fabric with an aqueous dispersion of the tertiary N-chlorourea and binder. This preimpregnation with the stabilizer can be carried out from an aqueous or organic medium, or the stabilizer actually to be used, if insoluble, can be formed on the fabric, as by impregnation with an aqueous solution of a soluble salt of the alkaline earth metal, precipitating the desired insoluble weak acid salt by addition of an aqueous solution of a soluble salt containing the desired acid radical, and drying. Still another process is to treat the fabric first with an aqueous dispersion of the stabilizer and tertiary N-chlorourea, then with an emulsion or solution of the binder. It is also possible to print a mixture of stabilizer and the tertiary N-chlorourea onto the fabric or paper from suitable printing pastes.

Any salt of an element of an alkaline earth metal with an acid of dissociation constant less than about $1.5 \times 10^{-2}$, which salt is substantially non-reactive with the tertiary N-chlorourea under conditions of formulation, can be employed as the stabilizer. These compounds retard loss of active chlorine from the tertiary N-chlorourea in contact with the fabric and offset whatever chemical changes which otherwise take place to cause tendering of the fabric. One or more such compounds may be used, among them the alkaline earth metal salts of the following weak acids: salicylic, lactic, benzoic, naphthenic, carbonic, phytic, boric, silicic, acetic, pectic, phthalic, stearic, and the like. Calcium carbonate is the preferred stabilizer.

The stabilizers must be substantially inert toward the tertiary N-chlorourea under the conditions of formulation. Whether or not a given compound fulfills the requirement of inertness may be determined at times from its chemical structure. For example, it is known that the amino group reacts with positive halogen, and therefore salts of amino acids are excluded from consideration. In instances where possible reactivity of the stabilizer is not apparent on mere inspection of its formula, the following simple test may be used. A tertiary N-chlorourea in finely divided form is mixed intimately with 10% of its weight of the compound to be tested, and the mixture is placed in a tightly sealed glass bottle. If, after storage for six hours at 60° C., the tertiary N-chlorourea retains at least 95% of its original active chlorine, as determined by iodine titration, the candidate stabilizer is considered to be substantially non-reactive toward the N-chlorourea. By means of the above-described test, it is possible to exclude at once the unsuitable compounds, examples of which are the salts, with alkaline earth metals, of such acids as hydrogen sulfide, hydrogen selenide, arsenious acid, hydroquinone or ethylenically unsaturated acids.

The proportion of the stabilizer may be as little as 1% or as much as 200% (based on the weight of the tertiary N-chlorourea) depending on such factors as: (a) the percent active chlorine in the tertiary N-chlorourea to be used; (b) the length of the period desired for useful life of the fabric; (c) the anticipated time and severity of exposure; (d) the method of application; and (e) the effectiveness of the particular stabilizer chosen. As to (a), the greater the percent active chlorine, in general the more stabilizer needed; for example, the optimum amount of calcium carbonate for the tertiary N-chlorourea of Examples I and II is about 10–20% based on the weight of the tertiary N-chlorourea, while the optimum for that of Example III is about 20–50%. As to (b), the life of the fabric is in general directly proportional to the amount of the stabilizer, and the maximum amount which will not affect other properties, such as stiffness and feel, would normally be chosen. As to (c), maximum stability within short periods is attained with relatively small amounts of the stabilizer, e.g., about 5–10% calcium carbonate with the tertiary N-chlorourea of Example I, and the requirements in this respect must be balanced against those under (a) and (b). As to (d), lesser amounts of the stabilizer will usually be needed when it is finely divided and highly dispersed. Actually there is no limit to the amount of stabilizer which can be used except as may be determined by practical considerations.

In selecting the type of agent to provide the "active" chlorine, any tertiary N-chlorourea can, so far as is known, be used. The urea nitrogens should be hydrogen-free, i.e., tertiary, and at least one of them should be joined to a chlorine atom. The carbons directly attached to the urea nitrogens should preferably also be hydrogen-free since this type of tertiary N-chlorourea has less tendency toward chemical rearrangement to a different compound. Illustrative of this class are the bicyclic compounds known as glycolurils which are derived from urea and alpha, beta diketones and have the following formula wherein R and R' are the ketone residues:

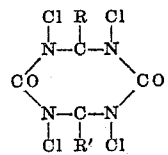

These compounds combine a high percentage of active chlorine with relatively high stability against rearrangement. Specific tertiary N-chloroureas which can be used instead of those of the examples in the practice of the invention are:

N,N'-di-(2,6-dimethylphenyl)-N,N'-dichlorourea
N,N'-di(2,6-dichlorophenyl)-N,N'-dichlorourea
N,N-diphenyl-N'-chloro-N'-(2,6-dimethylphenyl)urea
1,3,4,6-tetrachloro-3a,6a-diethylglycoluril,
1,3,4,6-tetrachloro-5-imino-3a,6a-dimethylglycoluril,
5,5-dimethyl-1,3-dichlorohydantoin,
5,5-diphenyl-1,3-dichlorohydantoin,
5-methyl-5-isobutyl-1,3-dichlorohydantoin,
1,3,5-trichloro-s-triazinetrione,
1,1' - methylene-bis-(3-chloro-5-methyl-5-isobutylhydantoin), and
1,1'-methylene-bis-(3-chloro-5,5-dimethylhydantoin)

Both the tertiary N-chlorourea and the stabilizer should, for best results, be employed in finely divided form, i.e., an average particle size of less than about 10 microns. Some of the tertiary N-chloroureas, in particular that of Example I, are difficult to obtain or prepare in this form, and must usually be subjected to some appropriate preliminary treatment, such as passage through an air micronizer, or by a preliminary wet pebble mill grinding followed by dry disintegration. If the finely divided tertiary N-chlorourea is not to be used for some time, the crude material is desirably micronized or ground with a small amount of the stabilizer.

A variety of dispersing agents can be employed. For best results, the dispersing agent or agents used should be chosen in the light of the dispersing medium (aqueous or organic), and of the auxiliary components present, especially the binder. In organic solvent media, which in general dissolve all components except the stabilizer and any pigments present, dispersing agents for the latter materials which may be used include soya lecithin and the calcium salt of sulfonated petroleum oil. In aqueous dispersions or in pastes to be emulsified in water (both or which generally contain water-insoluble binders such as chloroparaffin), non-ionic, polyhydroxylated protective colloids may be employed as dispersing agents, among them polyvinyl alcohol, starch, methyl starch, starch acetate, flour paste, dextrin, incompletely methylated celluloses, cellulose glycollic acid, and certain vegetable gums such as gum arabic, gum tragacanth, "Galogum," and "Lupogum." Of these dispersing agents, polyvinyl alcohol (i.e., any water-soluble partly or completely hydrolyzed polyvinyl ester, preferably a highly viscous partially hydrolyzed polyvinyl acetate having a saponification number of about 130 to 160) gives outstanding results in that it can be employed under practically any of the numerous and often quite crude conditions under which aqueous dispersions are formulated and used (e.g., with sea water of various degrees of contamination), and in that it can be employed with auxiliary components of all kinds and of all degrees of purity; also, unlike many of the other polyhydroxylated, non-ionic polymeric dispersing agents, polyvinyl alcohol does not cause any appreciable loss of active chlorine from the tertiary N-chlorourea, before or after the dispersion is applied to the fabric. It has the further advantage that it can function both as the dispersing and as the binding agent.

In aqueous systems, the alkali metal salts of sulfonated naphthalene-formaldehyde condensation products, such as those having the trade names "Daxad-11," "Tamol NNO," "Darvan-1," "Foamapin," and "Fastan Niocet," are also highly effective dispersing agents; and they are in fact desirably employed, even though other dispersing agents may be present, since their combination with the stabilizer (especially calcium compounds and in particular calcium carbonate) gives compositions which retain their active chlorine to a greater degree than analogous compositions from which they are omitted; they are, however, relatively poor dispersing or emulsifying agents for binders such as chloroparaffin, and, if binders are present, polyvinyl alcohol or another material which will emulsify them should be additionally employed. Still other dispersing agents which can be used in special cases in aqueous or organic systems include ionic types such as sulfonated lignin, sulfonated alkylbenzenes and alkylnaphthalenes, sulfated long chain alcohols, and hydrolyzed reaction products of mineral oils with chlorine and sulfur dioxide.

A binder is not essential but is usually desirable. For this purpose any substantially non-volatile, usually water-insoluble material which is a solvent for mustard gas, is non-reactive toward the tertiary N-chlorourea, and preferably is a highly viscous liquid or semi-solid at room temperature, can be used. Suitable binders in addition to the chlorinated paraffin of the examples are polyisobutylene, chlorinated polyisobutylene, mineral oil, paraffin, motor oil and chlorinated stearic acid. As employed herein, these binders do not form a continuous paint-like film on the the object or material to which the impregnating composition is applied. Their purpose is to attach the stabilized tertiary N-chlorourea to the material being treated in such manner, i.e., as active, discrete particles, that the active chlorine will be readily available for its intended purpose, e.g., neutralization of the vesicant. More specifically, in the case of impregnated fabrics, it is essential that air-permeability be retained if the fabric is to be of use as clothing. Therefore, the binders, when used, are either of the type which normally do not form a continuous, solid, non-porous film or are used in amounts insufficient to form such a film. The term "impregnating composition" as used herein is intended to mean that the compositions of this invention are of such type, and not paints.

Suitable solvents in which the impregnating mixture can be dispersed comprise any volative solvent for the tertiary N-chlorourea which is nonreactive therewith under conditions of formulation. In addition to the tetrachloroethane of the examples, other chlorinated hydrocarbons, such as tetrachloroethylene, dichloromethylene, ethylene dichloride, chlorobenzene, and chloroform, can be used, also ethers such as dioxane and glycol dimethyl and diethyl ethers, and hydrocarbon mixtures such as gasoline, Stoddard solvent, kerosene, and the like. If desired, organic solvents, particularly tetrachloroethylene, may be added to aqueous emulsions to facilitate impregnation.

In preparing dispersions on a large scale, anti-foam agents are often needed, and long chain alcohols, in particular lauryl alcohol or the mixtures obtained by hydrogenating fatty oils such as coconut oil, are suitable for this purpose. Other materials which can be included, as needed and desired, are textile waterproofers, adhesives to improve wash-fastness, non-irritant agents as disclosed in U.S. 1,820,607, and pigments and dyes to produce any desired color, e.g. yellow iron oxide, certain chromites, phthalocyanines, or anthroaquinone dyes.

While the compositions of this invention are designed specifically for treatment of cellulosic fibers and fabrics to render them resistant to vesicant vapors without causing loss of tensile strength, they may also be applied with similar and other results to any other cellulosic web, such as paper, and to other cellulosic materials, or manufactures therefrom, such as regenerated cellulose fibers and films, cotton, cellulose derivatives, wooden surfaces, and the like. From such treated materials may be made such articles as bandages having a long effective life, window shades and wall paper for hospitals and similar buildings, and coverings for any area or surface where slow controlled liberation of chlorine is desired. Other uses of this type will suggest themselves to those skilled in the art and are included in the scope of the invention.

The compositions of this invention may also be used in other ways as anti-vesicants. Thus, they can be employed in the form of ointments for application to the skin to minimize the effect of exposure to the vesicant, or they can be scattered as a powder or slurry over areas and surfaces which have been contaminated with the vesicant.

The compositions of this invention are for several reasons of particular value in the preparation of air-permeable clothing. The most important is that the fabric is rendered resistant to attack by the tertiary N-chlorourea decomposition products and/or reaction products with the vesicant, there being as a consequence no loss of tensile strength; moreover, it is usually possible to reimpregnate and reuse the fabric after the tertiary N-chlorourea thereon has been consumed by exposure to the vesicant. Also, the high available chlorine is retained in the fabric for longer periods than previously possible, thus lengthening its useful life. A still further point is that the compositions of the invention, in the form of aqueous dispersions containing the usual binders, do not, upon being applied to fabrics, break up with formation of oil spots and a mottled appearance. Moreover, the compositions themselves are not subject to settling and caking in any substantial amount prior to the time they would normally be used, and any settled solid material is readily redispersible. Lastly and more specifically, the combination of the stabilizer with an alkali metal salt of sulfonated naphthalene-formaldehyde condensation products gives a particularly high level of retention of chlorine and tensile strength in the fabric.

In my co-pending application, Serial No. 529,826, filed April 6, 1944, I have disclosed certain other stabilizers useful in the treatment of fabrics and clothing for protection against the action of vesicants like mustard gas. The stabilizers in that application are broadly characterized as being compounds of elements having atomic numbers from 24 to 30 inclusive such as salts of chromium, manganese, iron, cobalt, copper, and zinc with weak acids. The preferred stabilizer of the type is zinc oxide. One or more such compounds may also be used with one or more stabilizing agents of the present invention in the impregnating compositions comprising a tertiary N-chlorourea. However, the preferred stabilizer used by Chemical Warfare Service in impregnation of permeable protective clothing with a tertiary N-chlorourea particularly in organic solvents is calcium carbonate.

It is not intended that this invention be restricted by any theory on the action of the stabilizers in preserving the impregnated protective clothing. Neither is it intended to be restricted as to the exact nature of the alkaline earth metal compound stabilizer in the final form of the impregnating composition, although the preferred kind of stabilizing compounds as admixed with other ingredients of the impregnation composition has been clearly described.

As many apparently widely different embodiments of this invention may be made without departing from the spirit and scope thereof, it is to be understood that I do not limit myself to the specific embodiments thereof except as defined in the appended claims.

I claim:

1. A composition of matter consisting of about 100 parts of N,N'-di-(2,4,6-trichlorophenyl)-N,N'-dichlorourea and from about 1 part to about 200 parts of a stabilizer consisting of an alkaline earth metal salt of a weak acid having a dissociation constant less than $1.5 \times 10^{-2}$, said composition being characterized in that when applied to a surface it leaves, after evaporation of any dispersing medium, the ingredients contained in said composition in the form of a discontinuous layer.

2. A composition of matter consisting of about 100 parts of N,N'-di-(2,4,6-trichlorophenyl)-N,N'-dichlorourea and from about 10 to 20 parts of calcium carbonate admixed, said composition being characterized in that when applied to a surface it leaves, after evaporation of any dispersing medium, the ingredients contained in said composition in the form of a discontinuous layer.

3. Air-permeable vesicant protective clothing consisting essentially of a fabric impregnated with the tertiary N-chlorourea N,N'-bis-(2,4,6-trichlorophenyl)-N,N'-dichlorourea and from 10 to 20% of a calcium carbonate stabilizer for said chlorourea based on the weight of said tertiary N-chlorourea.

References Cited in the file of this patent

UNITED STATES PATENTS

| 1,968,796 | Bertsch | July 31, 1934 |
| 2,057,999 | Bowlby | Oct. 20, 1936 |
| 2,096,737 | Dinley | Oct. 26, 1937 |
| 2,430,233 | Magill | Nov. 4, 1947 |
| 2,628,174 | Stokes | Feb. 10, 1953 |
| 2,649,389 | Williams | Aug. 18, 1953 |

FOREIGN PATENTS

| 496,734 | Great Britain | Dec. 5, 1938 |